(12) United States Patent
Hwang et al.

(10) Patent No.: US 8,098,752 B2
(45) Date of Patent: Jan. 17, 2012

(54) APPARATUS AND METHOD FOR SUPPORTING A PLURALITY OF MIMO MODES IN A WIRELESS COMMUNICATION SYSTEM

(75) Inventors: In-Soo Hwang, Yongin-si (KR); Yung-Soo Kim, Seongnam-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 12/221,225

(22) Filed: Jul. 31, 2008

(65) Prior Publication Data

US 2009/0034639 A1    Feb. 5, 2009

(30) Foreign Application Priority Data

Jul. 31, 2007 (KR) .................. 10-2007-0077205

(51) Int. Cl.
*H04K 1/10* (2006.01)
(52) U.S. Cl. ........ 375/260; 375/267; 375/341; 375/299; 370/329; 370/476; 370/310
(58) Field of Classification Search .................. 375/267, 375/260, 341, 299; 370/329, 476, 310
See application file for complete search history.

(56) References Cited

U.S. PATENT DOCUMENTS

| | | | |
|---|---|---|---|
| 7,120,199 B2* | 10/2006 | Thielecke et al. | 375/267 |
| 7,477,699 B2* | 1/2009 | Wang et al. | 375/267 |
| 7,564,831 B2 | 7/2009 | Ihm et al. | |
| 2003/0185241 A1* | 10/2003 | Lu et al. | 370/476 |
| 2004/0082311 A1 | 4/2004 | Shiu et al. | |
| 2007/0147536 A1* | 6/2007 | Melzer et al. | 375/267 |
| 2007/0171849 A1* | 7/2007 | Zhang et al. | 370/310 |
| 2010/0284351 A1* | 11/2010 | Liang et al. | 370/329 |

FOREIGN PATENT DOCUMENTS

| | | |
|---|---|---|
| JP | 2006-71325 | 3/2006 |
| JP | 2006-100073 | 4/2006 |
| JP | 2006-110898 | 4/2006 |
| KR | 10-2005-0072772 | 7/2005 |
| KR | 10-2006-0033957 | 4/2006 |

* cited by examiner

*Primary Examiner* — Eva Puente

(57) ABSTRACT

An apparatus and method for supporting a plurality of MIMO modes in a wireless communication system are provided, in which a receiver selects one of the plurality of MIMO modes according to at least one of a received signal strength, a speed of the receiver, a correlation between a transmitter and the receiver, a presence or absence of channel quality information, a precoding index, and an antenna information, a rank, and a number of users, generates feedback information in a transmission format corresponding to the selected MIMO mode, and transmits the feedback information to the transmitter using a feedback resources allocated according to the selected MIMO mode.

16 Claims, 13 Drawing Sheets

APPARATUS AND METHOD FOR SUPPORTING A PLURALITY OF MIMO MODES IN A WIRELESS COMMUNICATION SYSTEM

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Jul. 31, 2007 and assigned Serial No. 2007-77205, the entire disclosure of which is hereby incorporated by reference.

TECHNICAL FIELD OF THE INVENTION

The present invention generally relates to a wireless communication system. More particularly, the present invention relates to an apparatus and method for supporting a plurality of multiple input multiple output (MIMO) modes in a wireless communication system.

BACKGROUND OF THE INVENTION

A system with multiple transmit and receive antennas has recently attracted interest to increase the reliability or throughput of signal transmission and reception in wireless communication systems. Such a system is called a MIMO system and there are a plurality of modes supporting the MIMO system (i.e., MIMO modes). Depending on whether a transmitter receives channel information feedback from a receiver, the MIMO modes are categorized into open-loop (OL) mode and closed-loop (CL) mode. Channel information is not fed back in the OL mode whereas channel information is fed back in the CL mode. A MIMO system using the OL mode is called an OL-MIMO system and a MIMO system using the CL mode is called a CL-MIMO system. The OL-MIMO system adopts space time coding (STC) in order to increase diversity order or multiplexing order, and the CL-MIMO system uses a different transmission scheme depending on whether there is a single or multiple receivers. If channel information feedback is very accurate, dirty paper coding (DPC) mode is used, in which the transmitter transmits data with channel interference eliminated.

At present, a unified MIMO system supporting both the OL mode and the CL mode is proposed. For efficient utilization of resources, a receiver notifies a transmitter (i.e., a base station (BS)) of its channel status, and the BS allocates resources to the receiver according to the channel status in the unified MIMO system.

However, as the number of receivers increases, feedback information also increases. As a result, resource efficiency decreases in the unified MIMO system.

Accordingly, there exists a need for a technique for reducing the amount of feedback information in the unified MIMO system.

There is also a need for a technique for selecting an optimal MIMO mode from among a plurality of MIMO modes, taking into account the environment of a receiver in the unified MIMO system.

SUMMARY OF THE INVENTION

To address the above-discussed deficiencies of the prior art, it is a primary object of the present invention to address the problems and/or disadvantages and to provide at least the advantages described below. Accordingly, an aspect of exemplary embodiments of the present invention is to provide an apparatus and method for reducing the amount of feedback information in a unified MIMO system.

Another aspect of exemplary embodiments of the present invention provides an apparatus and method for selecting an optimal MIMO mode from among a plurality of MIMO modes, taking into account the environment of a receiver in a unified MIMO system.

In accordance with an aspect of exemplary embodiments of the present invention, there is provided a method for supporting a plurality of MIMO modes in a receiver in a wireless communication system, in which one of the plurality of MIMO modes is selected according to at least one of a received signal strength, a speed of the receiver, a correlation between a transmitter and the receiver, the presence or absence of channel quality information, a preceding index, and antenna information, a rank, and the number of users. Feedback information is generated in a transmission format corresponding to the selected MIMO mode, and the feedback information is transmitted to the transmitter using feedback resources allocated according to the selected MIMO mode.

In accordance with another aspect of exemplary embodiments of the present invention, there is provided an apparatus for supporting a plurality of MIMO modes in a wireless communication system, in which a MIMO mode decider selects one of the plurality of MIMO modes according to at least one of a received signal strength, a speed of the receiver, a correlation between a transmitter and the receiver, the presence or absence of channel quality information, a preceding index, and antenna information, a rank, and the number of users. A feedback generator generates feedback information in a transmission format corresponding to the selected MIMO mode and transmits the feedback information to the transmitter using feedback resources allocated according to the selected MIMO mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide an apparatus and method for reducing the amount of feedback information to efficiently use resources in a unified MIMO system.

The exemplary embodiments of the present invention also provide an apparatus and method for selecting an optimal MIMO mode from among a plurality of MIMO modes, taking into account the environment of a receiver in a unified MIMO system.

Figure 1:
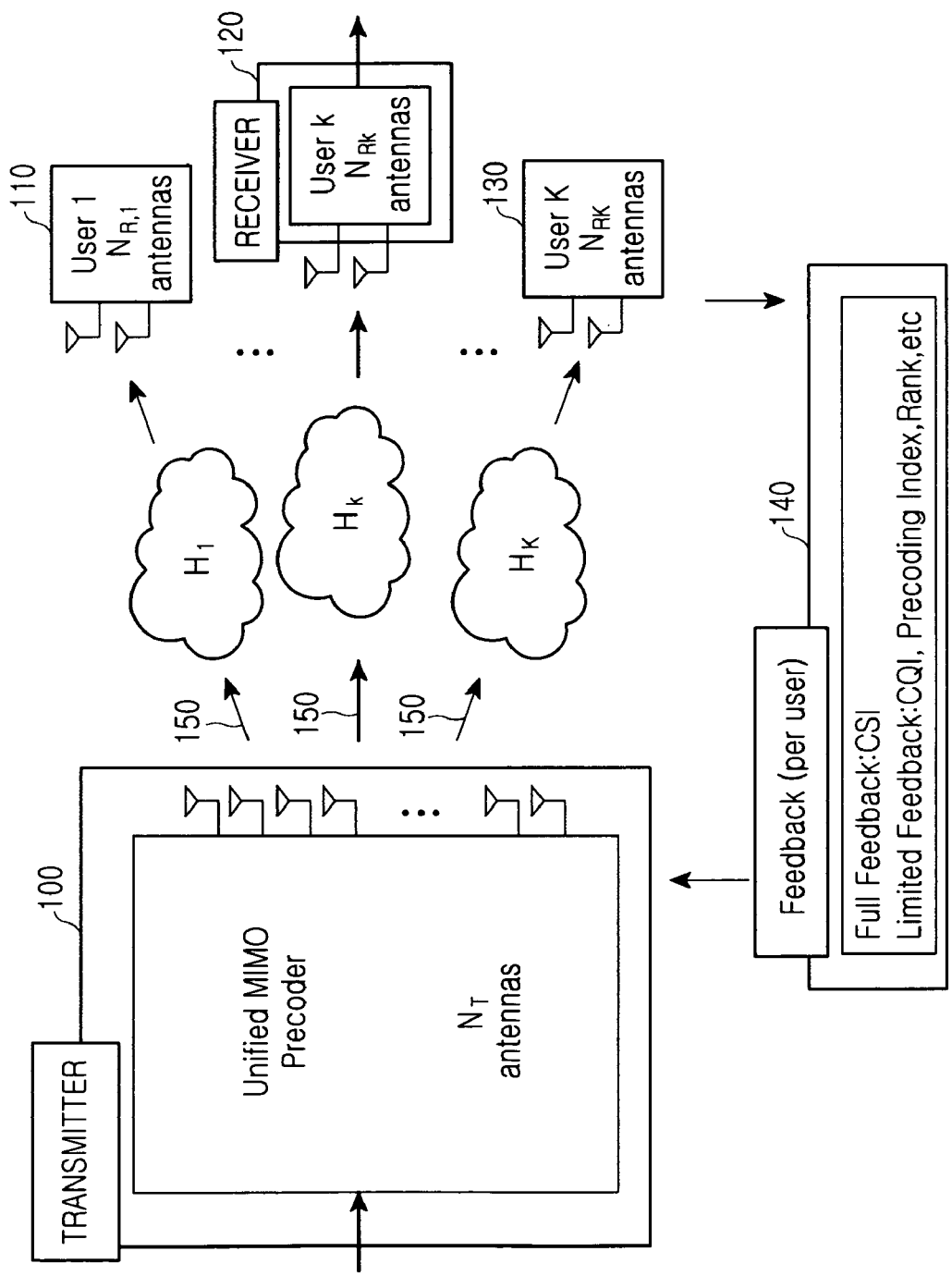
FIG. 1 is a block diagram of a unified MIMO system according to an exemplary embodiment of the present invention.

FIG. 1 is a block diagram of a unified MIMO system according to an exemplary embodiment of the present invention.

Referring to FIG. 1, each of receivers 110, 120 and 130 selects an optimal MIMO mode from among a plurality of MIMO modes according to its environment and transmits information about the selected MIMO modes to a transmitter 100. Each receiver also measures downlink channel information and transmits to the transmitter 100 feedback information 140 that includes at least one of the measured downlink channel information, channel state information (CSI), channel quality information/indicator (CQI), a codebook index, channel rank information, a whole or stream-based reception SINR, and decoding information. The CSI and CQI are optionally included in the feedback information depending on an available feedback channel. Then the transmitter 100 schedules data transmission according to the MIMO mode information and the feedback information received from the receivers 110, 120 and 130, allocates the receivers 110, 120 and 130 to streams or antennas according to the scheduling result, and transmits to the receivers 110, 120 and 130 a downlink frame that includes a downlink MAP message that provides information about the scheduling and resource allocation information for the receivers 110, 120 and 130, and a downlink burst area with data for the receivers 110, 120 and 130, as indicated by reference numeral 150. The receivers 110, 120 and 130 decode the downlink frame, thus acquiring their data.

Figure 2:
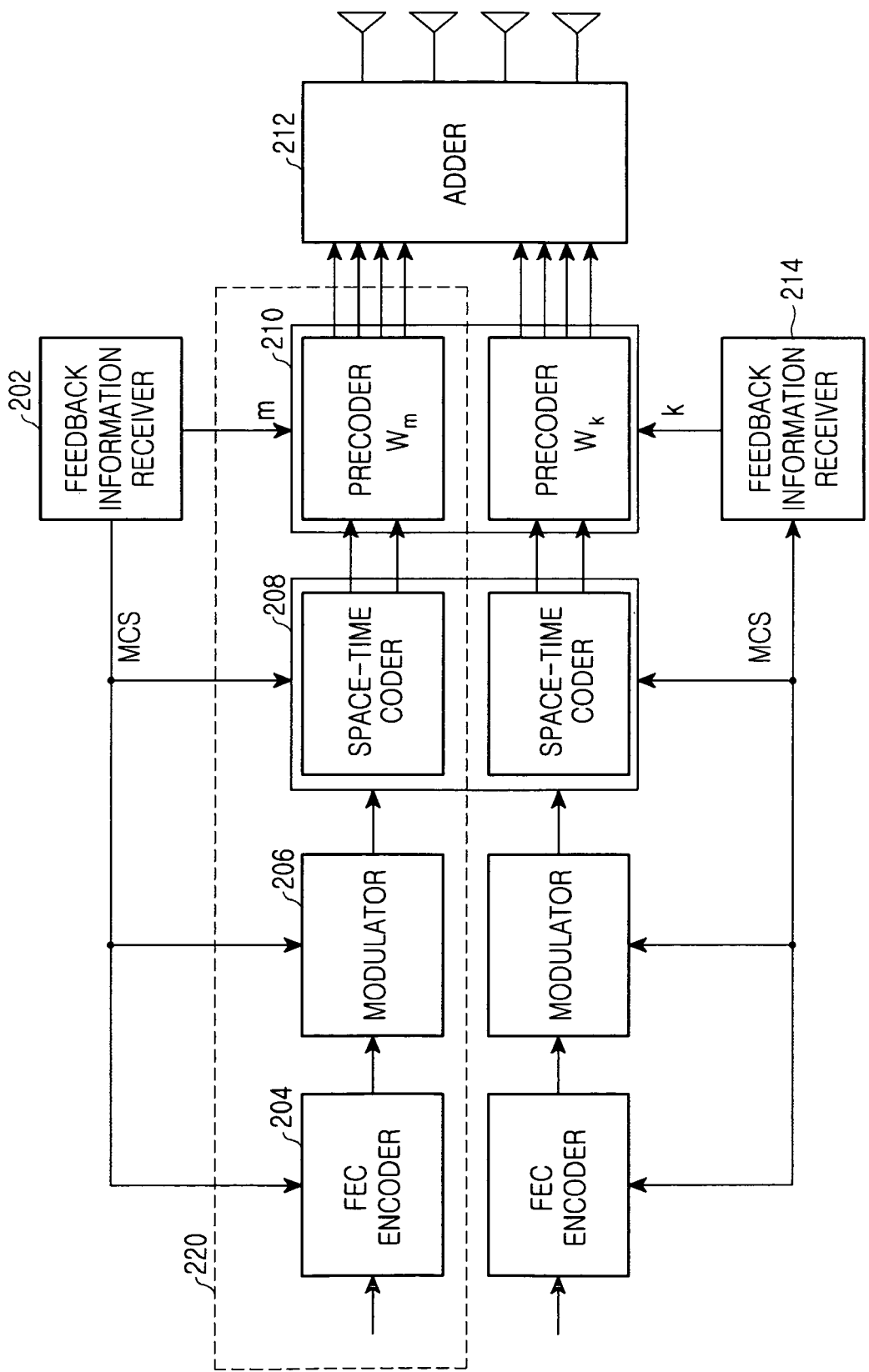
FIG. 2 is a block diagram of a transmitter in the unified MIMO system according to an exemplary embodiment of the present invention.

FIG. 2 is a block diagram of the transmitter in the unified MIMO system according to an exemplary embodiment of the present invention.

Referring to FIG. 2, the transmitter includes feedback information receivers 202 and 214, at least one transmission path 220, and an adder 212. A forward error correction (FEC) encoder 204, a modulator 206, a space-time encoder 208, and a precoder 210 reside in the transmission path 220.

In operation, the feedback information receivers 202 and 214 receive feedback information and MIMO information from a receiver, determines a MIMO mode for the receiver based on the MIMO mode information, and transmits the determined MIMO mode to the transmission path 220. The feedback information receiver 202 determines a modulation and coding scheme (MCS) level for the receiver according to the received feedback information and outputs information about the MCS level to the FEC encoder 204, the modulator 206, and the space-time encoder 208. If the feedback information includes a precoder index being the index of a preceding matrix for use in the precoder 210, the feedback information receiver 202 outputs the precoder index to the precoder 210.

In the transmission path 220, information about uplink resources allocated to the receiver is generated according to the MIMO mode and a downlink frame including the uplink resource information is transmitted to the receiver. Also, data is encoded, modulated, and space-time encoded according to the MCS level in the FEC encoder 204, the modulator 206, and the space-time encoder 208 and then precoded using the precoder index in the precoder 210. The precoded signal is transmitted to the receiver.

To be more specific, the FEC encoder 204 adds redundancy bits to information bits according to the MCS level so that the receiver can correct errors as well as detect the errors during decoding. The modulator 206 determines a modulation scheme according to the MCS level and modulates the coded bits received from the FEC encoder 204. The space-time encoder 208 space-time encodes the modulation symbols received from the modulator 206 according to the MCS level. The precoder 210 decides on a precoder according to the precoder index and precodes the space-time coded modulation symbols using the determined precoder.

The space-time coding and the preceding are optional according to the determined MIMO mode. For instance, if the MIMO mode is an OL MIMO mode, the feedback information receiver 202 determines an MCS level corresponding to the OL MIMO mode based on the feedback information. The space-time encoder 208 space-time encodes the modulation symbols according to the determined MCS level and outputs the space-time coded modulation symbols directly to the adder 212 without preceding in the precoder 210 because the OL MIMO mode uses space-time coding, not preceding.

If the MIMO mode is a DPC MIMO mode, the feedback information receiver 202 determines an MCS level corresponding to the CL-DPC MIMO mode based on the feedback information. The space-time encoder 208 is deactivated, and the modulator 206 outputs the modulation symbols directly to the precoder 210. The precoder 210 decides on a precoder according to the precoder index, precodes the modulation symbols using the determined precoder, and outputs the precoded symbols to the adder 212. While it has been described that the transmitter supports the OL MIMO mode and the CL-DPC MIMO mode, it can support at least one of the OL MIMO mode, the CL MIMO mode, and the DPC mode. The transmitter can also schedule receivers operating in different MIMO modes simultaneously. While the transmitter is responsible for determining an MCS level in the above description, the receiver can determine an MCS level and notify the transmitter of the MCS level.

Figure 3:
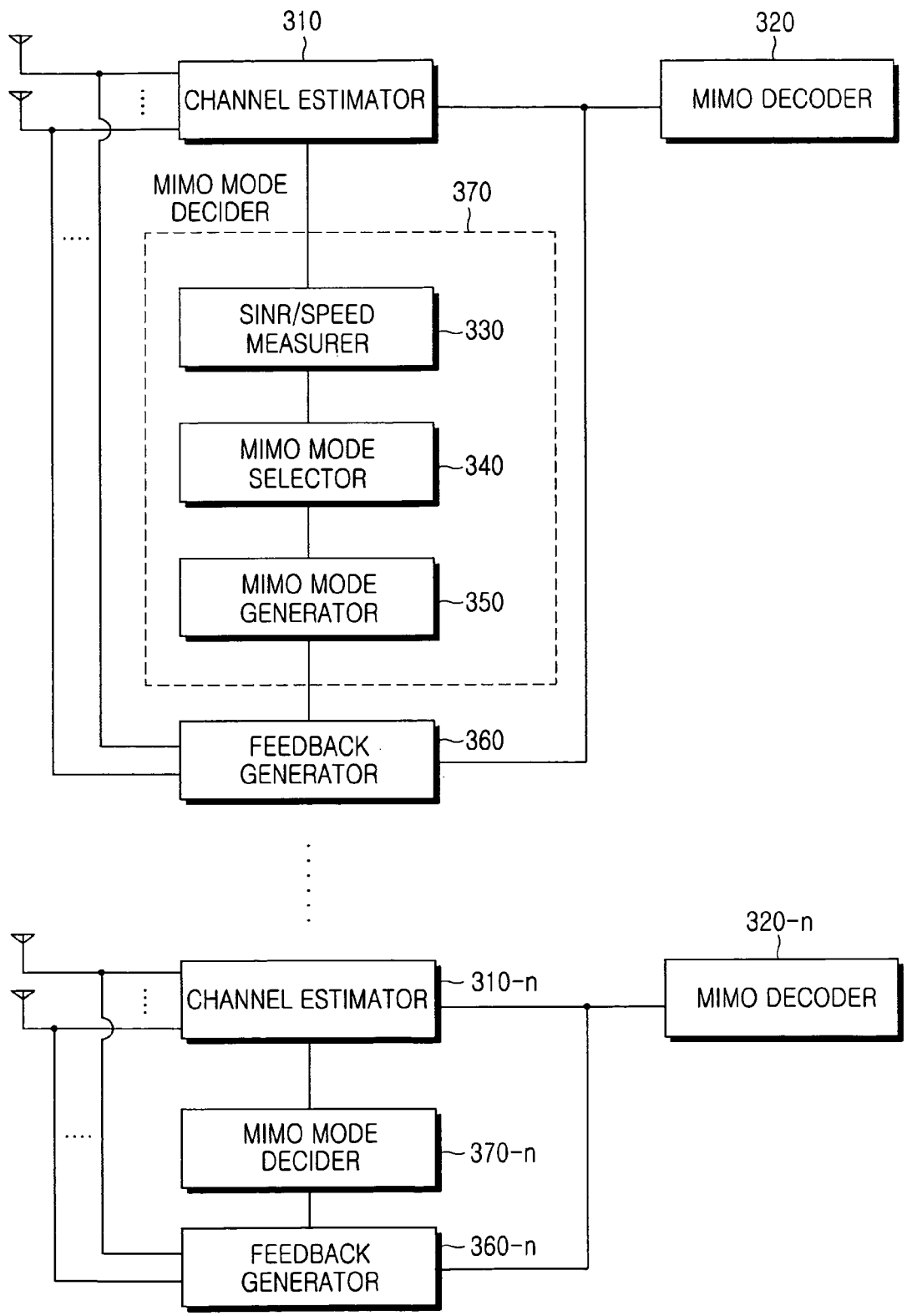
FIG. 3 is a block diagram of a receiver in the unified MIMO system according to an exemplary embodiment of the present invention.

FIG. 3 is a block diagram of a receiver in the unified MIMO system according to an exemplary embodiment of the present invention.

Referring to FIG. 3, the receiver includes a channel estimator 310, a MIMO decoder 320, a MIMO mode decider 370, and a feedback generator 360. The MIMO mode decider 370 has an SINR/speed measurer 330, a MIMO mode selector 340, and a MIMO mode generator 350.

The SINR/speed measurer 330 measures the SINR and speed of the receiver. The MIMO mode selector 340 selects the best MIMO mode from among a plurality of MIMO modes, taking into account the SINR and speed measurements. The MIMO mode generator 350 generates MIMO mode information indicating the selected MIMO mode. A feedback generator 360 transmits the MIMO mode information to the transmitter.

Then a channel estimator 310 receives scheduling information and feedback resource allocation information about the receiver, and MIMO mode information indicating a MIMO mode determined by the transmitter. More specifically, the channel estimator 310 performs channel estimation by detecting common pilot symbols that are common to all users from a received signal, or by detecting dedicated pilot symbols specific to the receiver. After the channel estimation, the channel estimator 310 detects the scheduling information, the feedback resource allocation information, and the MIMO mode information from the received signal.

The feedback generator 360 generates feedback information based on the scheduling information, the feedback resource allocation information, and the MIMO mode information received from the channel estimator 310 and transmits the feedback information in a transmission format corresponding to the MIMO mode information to the transmitter.

Simultaneously, the channel estimator 310 outputs the MIMO mode information to the MIMO decoder 320. The MIMO decoder 320 selects a demodulation scheme corresponding to the MIMO mode information from among a plurality of demodulation schemes and demodulates the received signal according to the selected demodulation scheme.

Figure 4:
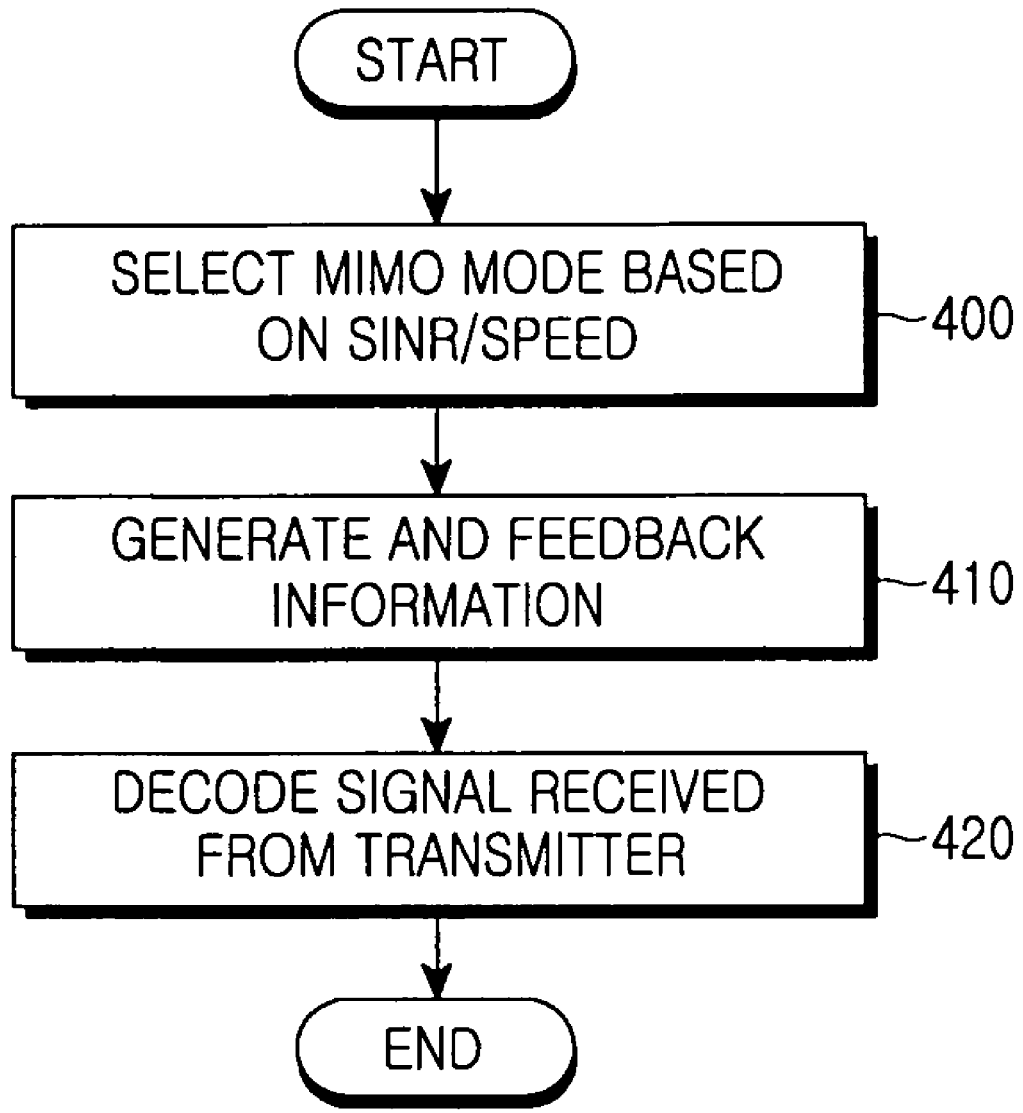
FIG. 4 is a flowchart illustrating an operation for performing a MIMO mode in the receiver in the unified MIMO system according to an exemplary embodiment of the present invention.

FIG. 4 is a flowchart illustrating an operation for performing a MIMO mode in the receiver in the unified MIMO system according to an exemplary embodiment of the present invention.

Referring to FIG. 4, the receiver measures its SINR and speed and selects a MIMO mode from among a plurality of MIMO modes according to the SINR or the speed in step 400. In step 410, the receiver generates feedback information based on scheduling information, MIMO mode information, and feedback resource allocation information received from the transmitter and transmits the feedback information to the transmitter. The receiver then receives a signal based on the MIMO mode information and acquires the received signal in step 420.

Figure 5A:
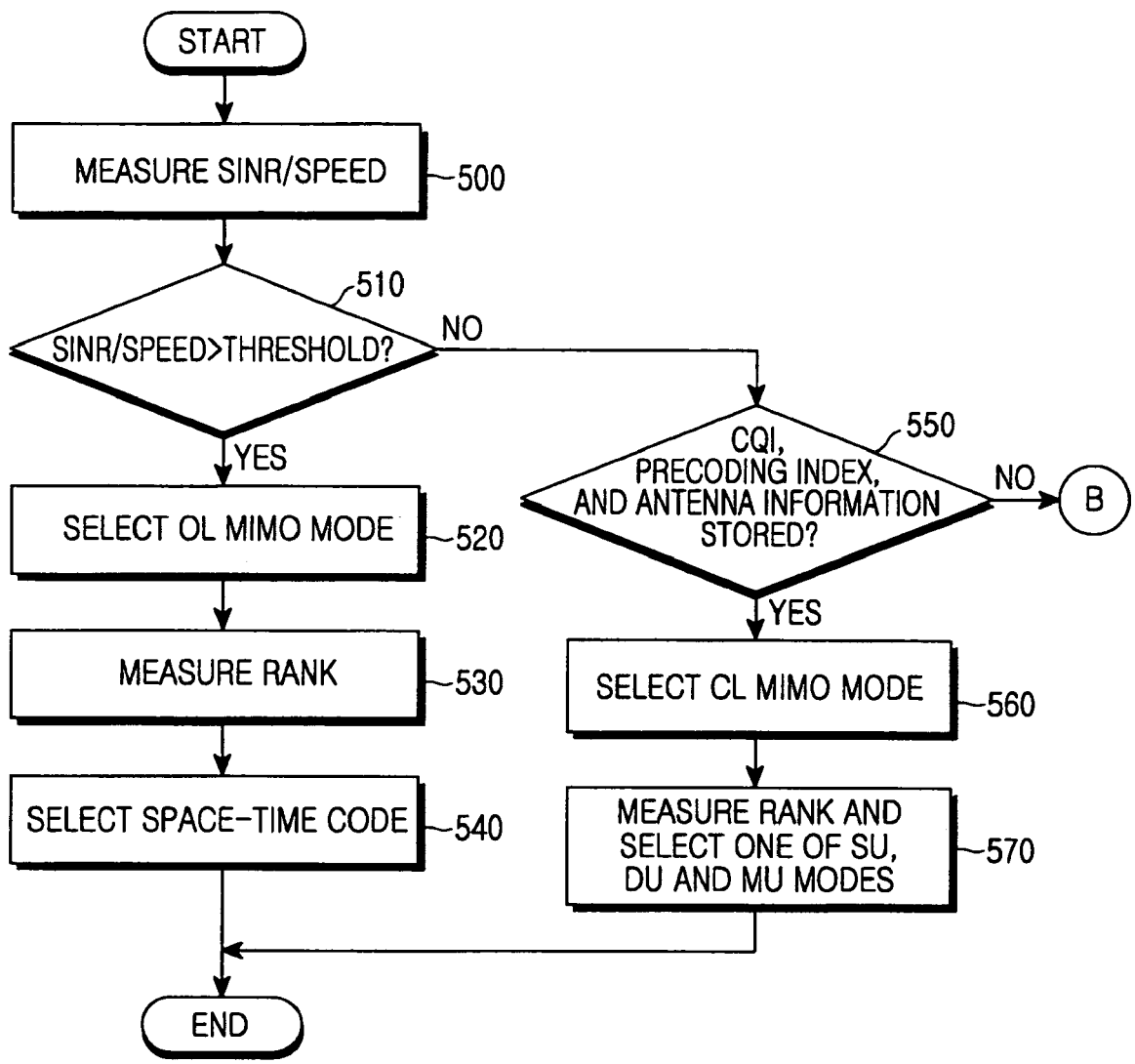
FIGS. 5A and 5B are a flowchart illustrating an operation for selecting a MIMO mode in the receiver in the unified MIMO system according to an exemplary embodiment of the present invention.
Figure 5B:
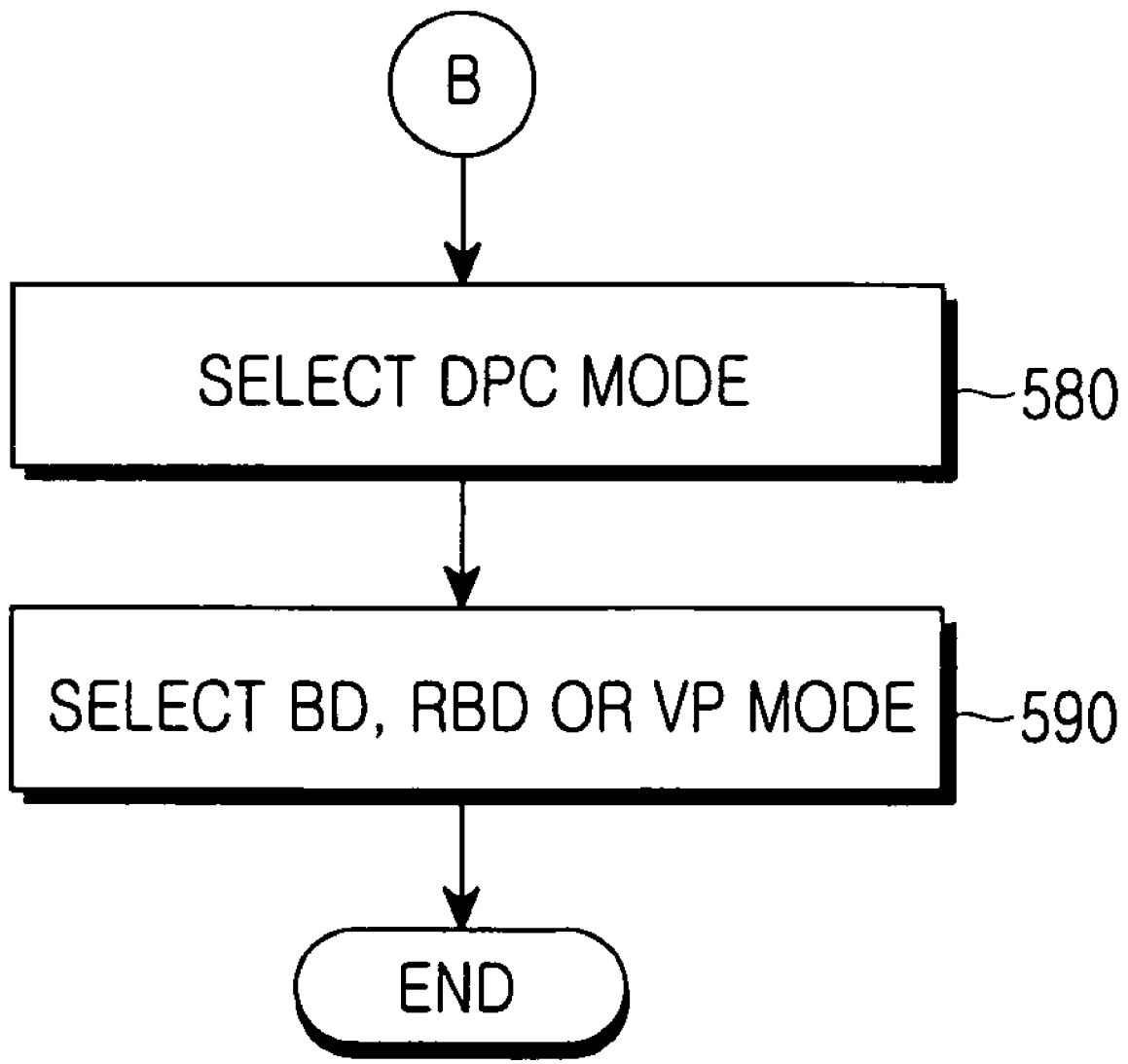

FIGS. 5A and 5B are a flowchart illustrating an operation for selecting a MIMO mode from among a plurality of MIMO modes in the receiver in the unified MIMO system according to an exemplary embodiment of the present invention.

Referring to FIG. 5A, the receiver measures its SINR and speed in step 500 and determines its state by comparing the SINR or speed with a predetermined first criterion (Criterion 1) in step 510. Criterion 1 is related to the speed or SINR of the receiver, preferably the speed of the receiver.

If the speed is larger than a speed threshold or the SINR is higher than an SINR threshold, the receiver selects an OL MIMO mode in step 520 and measures its rank in step 530. The rank is the number of streams with eigenvectors equal to or higher than a predetermined value in a channel matrix with a size of the number of receive antennas x the number of transmit antennas. In step 540, the receiver selects a space-time code from among a plurality of space-time codes, taking into account the rank information and the SINR measurement.

On the other hand, if the speed is equal to or less than the speed threshold or if the SINR is equal to or less than the SINR threshold, the receiver determines whether a second criterion (Criterion 2) is satisfied in step 550. Criterion 2 is the presence of a CQI, a precoding index, and antenna information (e.g., the number of transmit/receive antennas). If the receiver stores the CQI, the preceding index, and the antenna information, it proceeds to step 560 and otherwise, it jumps to step 580.

In step 560, the receiver selects a CL MIMO mode. The receiver then measures its rank and selects one of a single user (SU) mode, a dual user (DU) mode, and a multi-user (MU) mode according to the rank, the number of users, and an antenna spatial correlation in step 570.

Meanwhile, the receiver selects a DPC MIMO mode in step 580 and selects one of a block diagonalization (BD) mode, a regularized block diagonalization (RBD) mode, and a vector perturbation (VP) mode according to the SINR in step 590.

Figure 6:
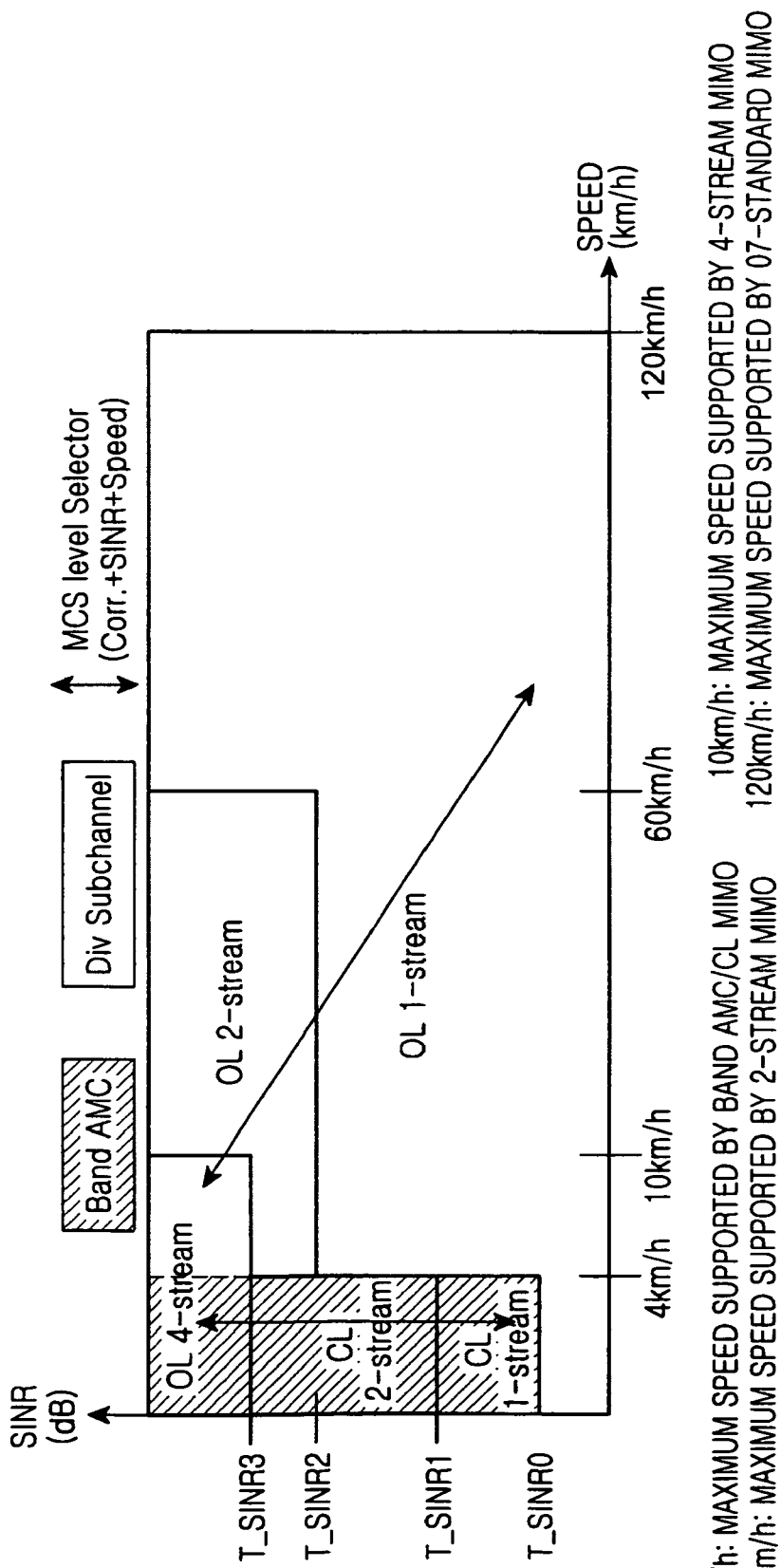
FIG. 6 illustrates a mode selection mechanism based on the signal-to-interference and noise ratio (SINR) and speed of the receiver in the unified MIMO system according to an exemplary embodiment of the present invention.

FIG. 6 illustrates a mode selection mechanism based on the SINR and speed of the receiver in the unified MIMO system according to an exemplary embodiment of the present invention.

Referring to FIG. 6, the horizontal axis represents the speed of the receiver and the vertical axis represents the SINR of the receiver. The receiver can select one of MIMO modes by comparing its SINR and speed with a plurality of thresholds.

If the transmitter allocates a diversity subchannel (Div Subchannel) to the receiver, the receiver can measure the average SINR of streams. If the transmitter allocates a band-adaptive modulation and coding (Band-AMC) subchannel to the receiver, the receiver measures the SINR of each stream. Hence, the receiver can determine an MCS level on a stream-by-stream basis.

The receiver selects one of MIMO modes by comparing its speed with speed thresholds and comparing its SINR with SINR thresholds. While the speed thresholds are set as 4 km/h, 10 km/h, 60 km/h and 120 km/h, they may vary depending on a wireless communication system. Also, while the speed and SINR of the receiver are taken into account for selection of a MIMO mode in the illustrated case of FIG. 6, channel correlation information between the transmitter and the receiver can further be considered in addition to the speed and SINR of the receiver.

Figure 7A:
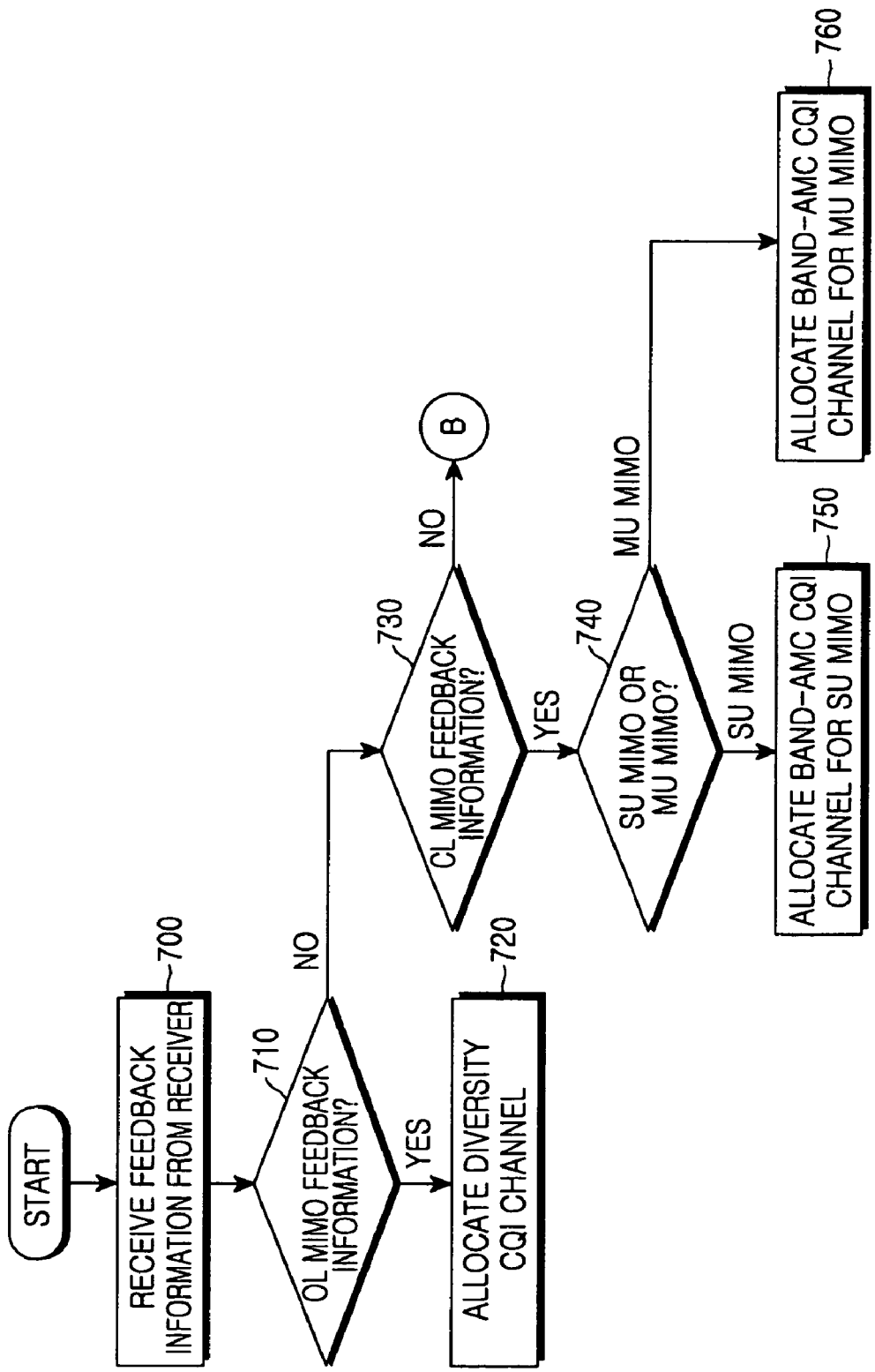
FIGS. 7A and 7B are a flowchart illustrating an operation for allocating a channel for each MIMO mode in the transmitter in the unified MIMO system according to an exemplary embodiment of the present invention.
Figure 7B:
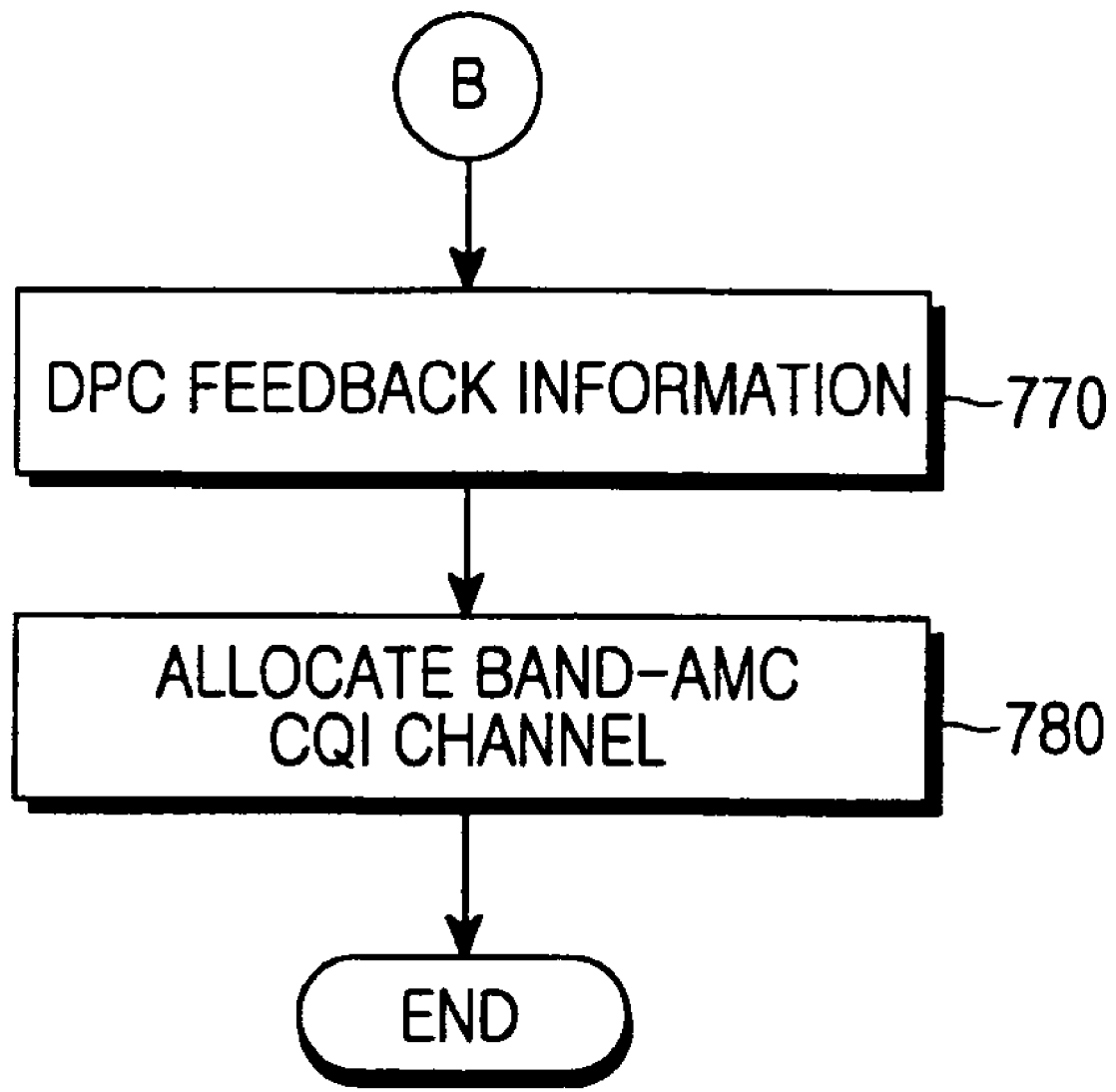

FIGS. 7A and 7B are a flowchart illustrating an operation for allocating a channel to the receiver according to a MIMO mode suitable for the receiver in the transmitter in the unified MIMO system according to an exemplary embodiment of the present invention.

Referring to FIG. 7A, the transmitter receives MIMO mode information from the receiver in step 700 and determines whether the received MIMO mode information indicates the OL MIMO mode in step 710. If the received MIMO mode information indicates the OL MIMO mode, the transmitter allocates a diversity CQI channel to the receiver in order to receive information about an average MCS level for a total frequency band from the receiver in step 720.

On the other hand, if the received MIMO mode information does not indicate the OL MIMO mode, the transmitter determines whether the MIMO mode information indicates the CL MIMO mode in step 730. If the MIMO mode information indicates the CL MIMO mode, the transmitter determines whether the MIMO mode information further indicates the SU mode or the MU mode in step 740. If the MIMO mode information further indicates the SU MIMO mode, the transmitter allocates a Band-AMC CQI channel to the receiver in order to receive information about a maximum band MCS level suitable for the SU mode from the receiver in step 750. Meanwhile, if the MIMO mode information further indicates the MU MIMO mode, the transmitter allocates a Band-AMC CQI channel to the receiver in order to receive information about a maximum band MCS level suitable for the MU mode from the receiver in step 760. Feedback information about the SU MIMO mode includes a rank and layer order index (RLOI), a maximum CQI of streams, and a delta CQI. Feedback information about the MU MIMO mode includes an RLOI, a maximum CQI of streams, and codebook information.

Figure 8:
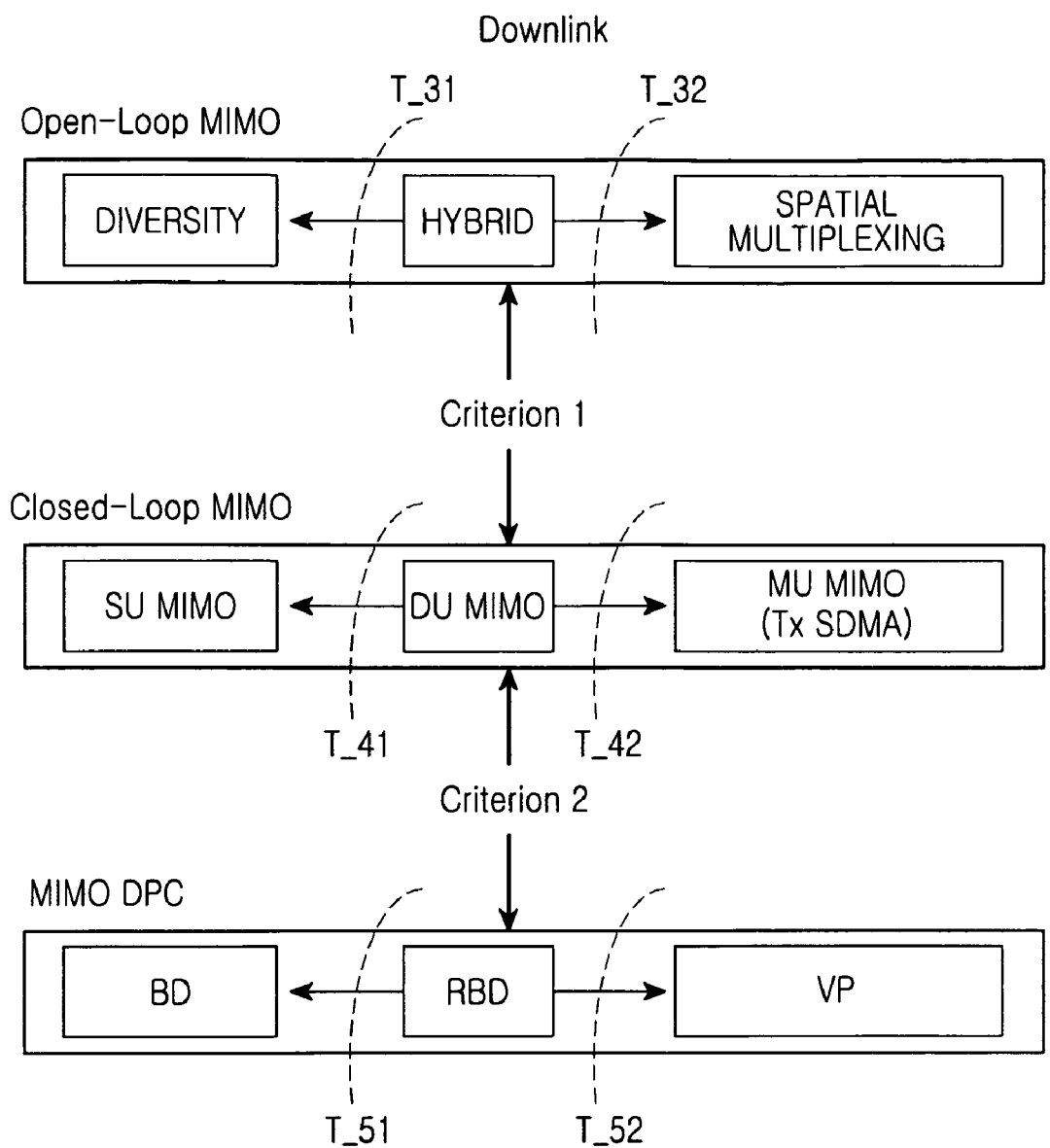
FIG. 8 is a diagram illustrating available MIMO modes for the transmitter and the receiver in the unified MIMO system according to an exemplary embodiment of the present invention.

If the received MIMO mode information does not indicate the CL MIMO mode in step 730, the receiver proceeds to step 770 of FIG. 7B. In step 770, the transmitter determines that the MIMO mode information indicates the DPC mode. Then the transmitter allocates a Band-AMC CQI channel to the receiver in order to receive information about a maximum band MCS level suitable for the DPC MIMO mode from the receiver in step 780. With reference to FIG. 8, a MIMO mode diagram for the unified MIMO system will be described below.

FIG. 8 is a diagram illustrating available MIMO modes for the transmitter and the receiver in the unified MIMO system according to an exemplary embodiment of the present invention.

Referring to FIG. 8, the MIMO modes are classified into the OL MIMO mode, the CL MIMO mode, and the DPC MIMO mode. The DPC MIMO mode requires the largest amount of feedback information and supports the highest data rate, whereas the OL MIMO mode requires the smallest amount of feedback information and supports the lowest data rate. The OL MIMO mode is distinguished from the CL MIMO mode by Criterion 1 and the CL MIMO mode is distinguished from the DPC MIMO mode by Criterion 2.

Criterion 1 specifies a channel state value for the receiver. For example, the channel state value is a speed threshold or a signal strength threshold (e.g., an SINR threshold). For example, if the speed of the receiver is larger than the speed threshold, the OL MIMO mode is decided to be optimal for the receiver. If the speed of the receiver is smaller than the speed threshold, the CL MIMO mode is selected as optimal for the receiver.

Criterion 2 is the presence of a CQI, a preceding index, and antenna information (e.g., the number of transmit/receive antennas). For example, if the receiver stores the CQI, the preceding index, and the antenna information, it is said that Criterion 2 is satisfied and the CL MIMO mode is determined as an optimal MIMO mode for the receiver. On the other hand, if the receiver does not store the CQI, the preceding index, and the antenna information, it is said that Criterion 2 is not satisfied, and the DPC MIMO mode is determined as an optimal MIMO mode for the receiver.

The individual MIMO modes will be described in great detail. The OL MIMO mode does not require feedback information from the receiver. One of space-time codes is selected according to the rank and SINR of the receiver. The space-time codes include a diversity space-time code, a hybrid space-time code, and a spatial multiplexing space-time code. The diversity space-time code or the hybrid space-time code is selected according to a 3-1 criterion ($T\_31$), and the hybrid space-time code or the spatial multiplexing space-time code is selected according to a 3-2 criterion ($T\_32$). $T\_31$ and $T\_32$ are associated with rank and can be set to be different depending on a communication system. The receiver measures its rank, selects one of the diversity space-time code, the hybrid space-time code, and the spatial multiplexing space-time code according to the rank, generates feedback information including the selected space-time code, and transmits the feedback information to the transmitter. The relation between ranks and space-time code types is illustrated in Table 1 below.

TABLE 1

| Rank (threshold) | Space-time code types |
|---|---|
| Below $T\_31$ | Diversity |
| $T\_31$ or higher and below $T\_32$ | Hybrid |
| $T\_32$ or higher | Spatial multiplexing |

For instance, if the rank of the receiver is less than $T\_31$, the diversity space-time code can be selected.

The CL MIMO mode requires feedback information from the receiver. The CL MIMO mode is further branched into the SU MIMO mode, the DU MIMO mode, and the MU MIMO mode depending on the number of users for which antenna resources are divided and an antenna spatial correlation.

If the transmitter uses four transmit antennas and each user has two receive antennas, three cases can be considered. One is the SU mode in which two streams are allocated to a single user, another case is the DU mode in which two streams are allocated to each of two users, and the other case is the MU mode in which one stream is allocated to each of four users. The SU mode is distinguished from the DU mode by a 4-1 criterion ($T\_41$), and the DU mode is distinguished from the MU mode by a 4-2 criterion ($T\_42$). $T\_41$ and $T\_42$ are related to the number of users and an antenna spatial correlation.

While a 4×2 MIMO system with four transmit antennas and two receive antennas has been taken as an example to describe $T\_41$ and $T\_42$, the same thing applies to an m×n MIMO system with m transmit antennas and n receive antennas.

The DPC MIMO mode requires feedback information, especially very accurate channel information from the receiver. The DPC MIMO mode is further broken into a BD mode in which the inverse of a channel matrix is computed for a plurality of receivers each having a plurality of antennas, an RBD mode that further takes into account noise variance in the BD mode, and a VP mode that achieves a theoretically maximum channel capacity. The BD mode is distinguished from the RBD mode by a 5-1 criterion (T_51), and the RBD mode is distinguished from the VP mode by a 5-2 criterion (T_52). T_51 and T-52 are related to SINR.

Figure 9:
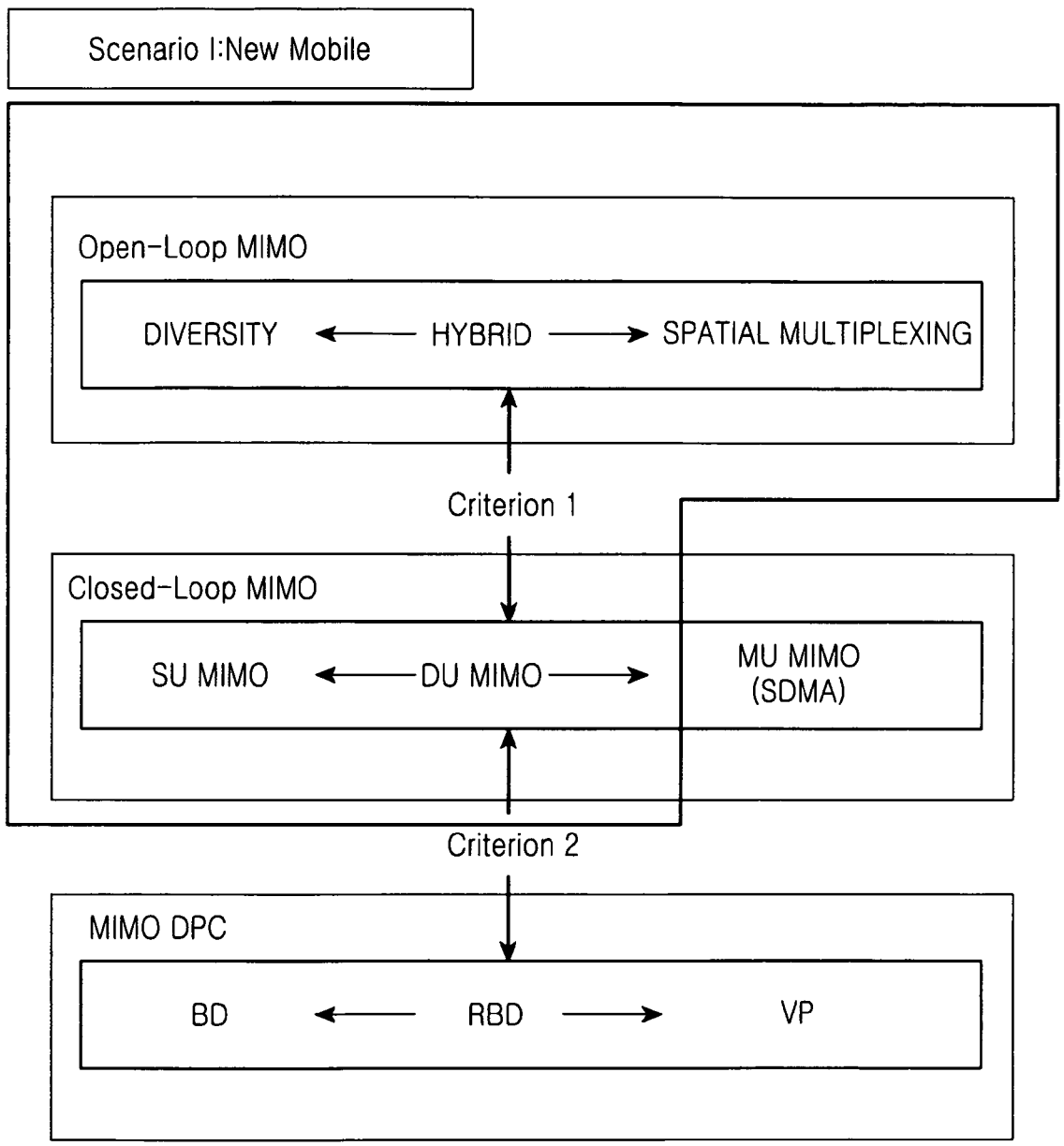
FIG. 9 illustrates an application of MIMO modes under a new mobile environment in the unified MIMO system according to an exemplary embodiment of the present invention.

FIG. 9 illustrates an application of MIMO modes under a new mobile environment in the unified MIMO system according to an exemplary embodiment of the present invention.

Referring to FIG. 9, under a new mobile environment characterized by a large cell size, a fast user speed, and support of a relatively low data rate, the transmitter does not support the DPC MIMO mode for the receiver. Therefore, the transmitter provides a low data rate to the receiver in one of the OL MIMO mode and the CL MIMO mode in the new mobile environment.

Meanwhile, in the case where the transmitter supports only the OL MIMO mode and the CL MIMO mode to the receiver, when the receiver moves to a new nomadic environment characterized by a small cell size and a low user speed, the transmitter allocates resources to the receiver based on a feedback of channel state information from the receiver and supports a high data rate for the receiver. If the receiver has a high channel gain and can transmit perfect channel information to the transmitter, it requests allocation of a feedback link suitable for the DPC MIMO mode to the transmitter, and then the transmitter allocates resources to the receiver by sounding or an analog feedback. The resource allocation refers to allocation of time, frequency, and spatial resources.

The transmitter can minimize the performance degradation of the receiver by use of a parameter that combines a space-time code of the OL MIMO mode with per user unitary rate control (PU2RC) of the CL MIMO mode. Also, the transmitter can further achieve a diversity gain using the space-time code. The PU2RC refers to extension of MU-MIMO to SU-MIMO.

Figure 10:
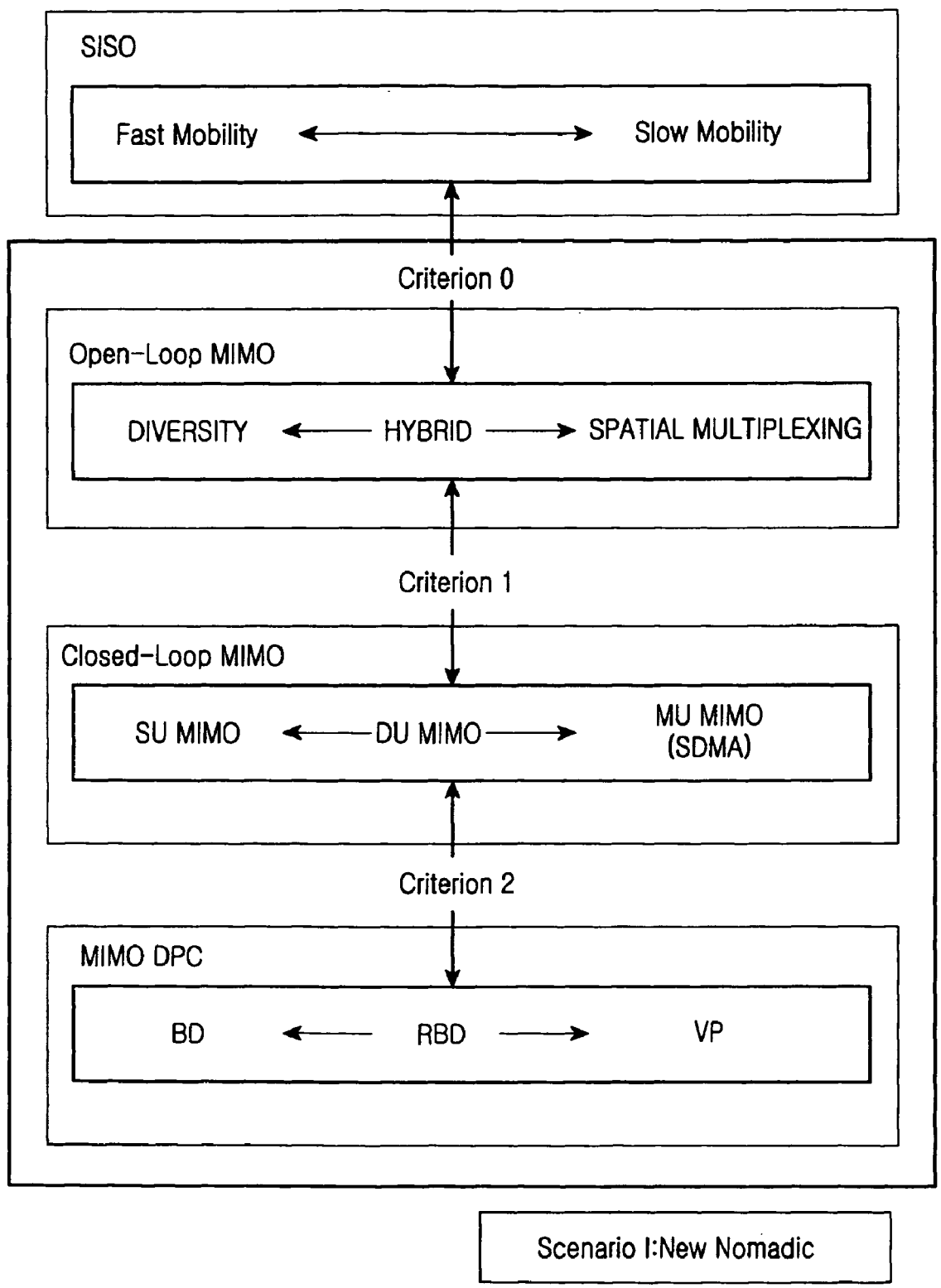
FIG. 10 illustrates an application of MIMO modes under a new nomadic environment in the unified MIMO system according to an exemplary embodiment of the present invention.

FIG. 10 illustrates an application of MIMO modes under a new nomadic environment in the unified MIMO system according to an exemplary embodiment of the present invention.

Referring to FIG. 10, under the new nomadic environment where receivers are densely populated in a small cell and move as slow as pedestrians, a single input single output (SISO) mode is rarely used. Thus, the transmitter can operate in a unified MIMO system using the OL MIMO mode, the CL MIMO mode and the DPC MIMO mode.

If the receiver is in a good channel status and thus the transmitter can cancel interference, the receiver can requests the DPC MIMO mode to the transmitter. The transmitter can use a parameter being a combination of the BD mode and the VP mode. As a consequence, the receiver does not need to feed back information to the transmitter and simply has to perform modulo operation for DPC decoding. The good channel state of the receiver refers to a high channel gain of the receiver and transmission of perfect channel information to the transmitter.

Figure 11:
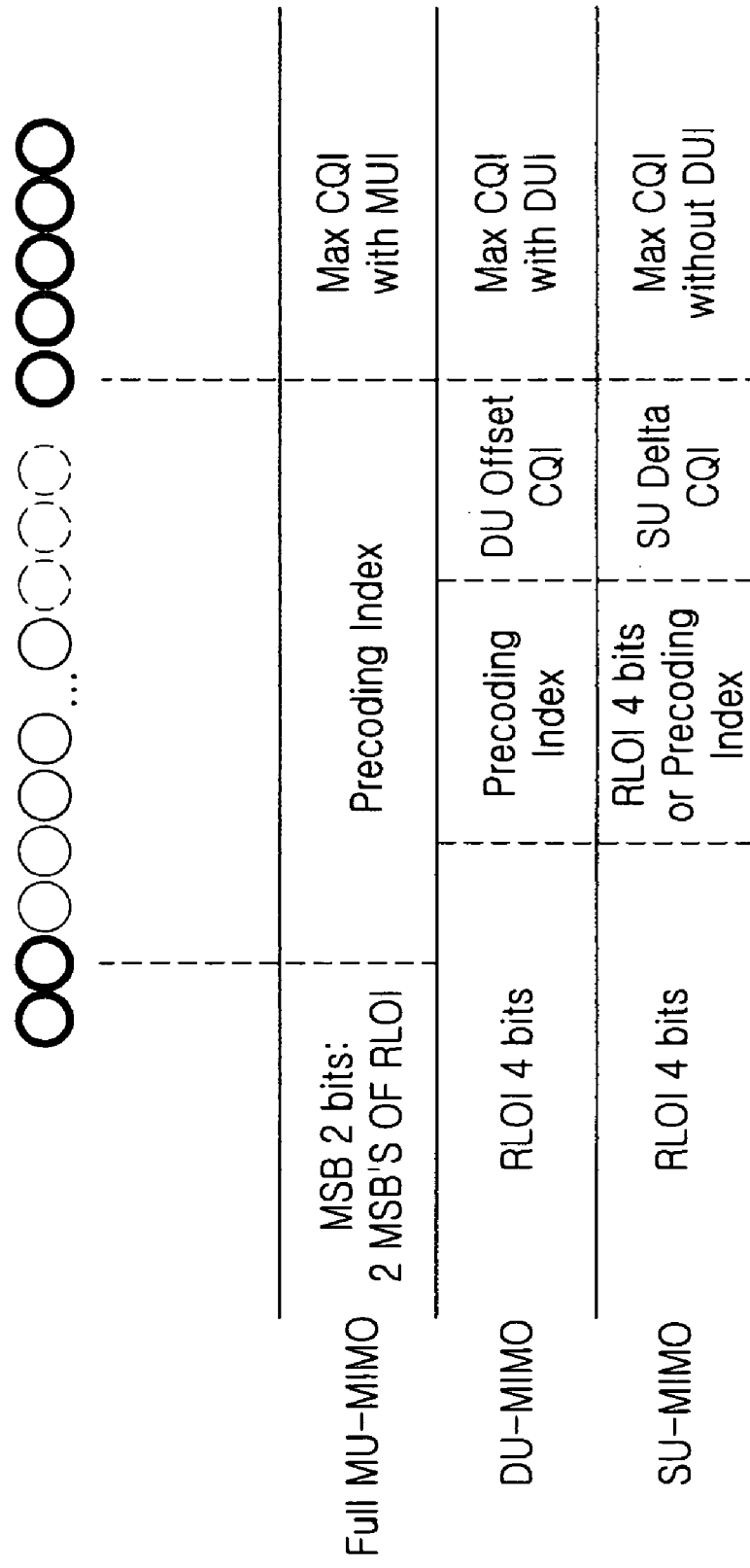
FIG. 11 illustrates the structure of CL MIMO feedback information in the unified MIMO system according to an exemplary embodiment of the present invention.

FIG. 11 illustrates an exemplary structure of feedback information from the receiver in the CL MIMO mode in the unified MIMO system according to an exemplary embodiment of the present invention.

Referring to FIG. 11, the CL MIMO mode is further branched into the SU mode, the DU mode, and the MU mode. If the single user mode is selected, the feedback information includes a rank and layer order index (RLOI), a maximum CQI of streams, and a delta CQI. If the multi-user mode is selected, the feedback information includes the RLOI, the maximum CQI of streams, and a precoding index. If the dual user mode is selected, the feedback information includes the RLOI, the maximum CQI of streams, and an offset channel quality information. Feedback information has the same length in the SU, DU and MU modes by adjusting the length of an RLOI in the SU and DU modes and the length of a precoding index in the MU mode. Since only one antenna is selected in the MU mode, the RLOI can be two bits long, and the other bits can be filled with a preceding index for a plurality of users in the feedback information of the MU mode. For the SU mode and the DU mode, a precoding index for determining a CQI order and a rank order is shortened in length, and an RLOI occupies four bits in the feedback information.

As is apparent from the above description, the present invention advantageously minimizes the amount of feedback information since a receiver selects an optimal MIMO mode from among a plurality of MIMO modes according to its environment. Also, a transmitter can transmit a minimum amount of information required for resource allocation to the receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting a plurality of multiple input multiple output (MIMO) modes in a receiver in a wireless communication system, comprising:
    selecting one of the plurality of MIMO modes according to a speed of the receiver, comprising:
        selecting an open-loop (OL) MIMO mode from among the plurality of MIMO modes, if the speed of the receiver is larger than a predetermined threshold; and
        selecting a closed-loop (CL) MIMO mode from among the plurality of MIMO modes, if the speed of the receiver is less than or equal to the predetermined threshold; and
    generating feedback information in a transmission format corresponding to the selected MIMO mode and transmitting the feedback information to a transmitter using a feedback resources allocated according to the selected MIMO mode.

2. The method of claim 1, further comprising:
    transmitting MIMO mode information indicating the selected MIMO mode to the transmitter; and
    receiving a feedback resource allocation information indicating the allocated feedback resources in response to the MIMO mode information.

3. The method of claim 1, wherein the MIMO mode selection further comprises:
    selecting the CL MIMO mode from among the plurality of MIMO modes, if the speed of the receiver is less than or equal to the threshold and the receiver does not have channel quality information, a precoding index, and antenna information; and
    selecting a dirty paper coding (DPC) mode from among the plurality of MIMO modes, if the speed of the receiver is less than or equal to the threshold and the receiver has the channel quality information, the precoding index, and the antenna information.

4. The method of claim 1, further comprising selecting one of a diversity mode, a hybrid mode, and a spatial multiplexing mode according to a receiver measurement rank and a received signal strength if the OL MIMO mode is selected.

5. The method of claim 3, further comprising selecting one of a single user mode, a dual user mode, and a multi-user mode according to a number of users and a correlation between the transmitter and the receiver if the CL MIMO mode is selected, wherein the number of users and the correlation between the transmitter and the receiver is further considered when selecting one of the plurality of MIMO modes.

6. The method of claim 3, further comprising selecting one of a block diagonalization (BD) mode, a regularized block diagonalization (RBD) mode, and a vector perturbation (VP) mode according to a received signal strength if the DPC mode is selected, wherein the received signal strength is further considered when selecting one of the plurality of MIMO modes.

7. The method of claim 3, wherein if the OL MIMO mode is selected, the allocated feedback resources include a diversity CQI channel, and if one of the CL MIMO mode and the DPC mode is selected, the allocated feedback resources include a band adaptive modulation and coding (AMC) CQI channel.

8. The method of claim 5, wherein if the single user mode is selected, the feedback information includes a rank and layer order index (RLOI), a maximum CQI of streams, and a delta CQI, if the multi-user mode is selected, the feedback information includes the RLOI, the maximum CQI of streams, and a precoding index, and if the dual user mode is selected, the feedback information includes the RLOI, the maximum CQI of streams, and an offset channel quality information, wherein the RLOI is further considered when selecting one of the plurality of MIMO modes.

9. An apparatus for supporting a plurality of multiple input multiple output (MIMO) modes in a wireless communication system, comprising:

a MIMO mode decider configured to select one of the plurality of MIMO modes according to a speed of the receiver; and a feedback generator configured to generate feedback information in a transmission format corresponding to the selected MIMO mode and transmit the feedback information to a transmitter using a feedback resource allocated according to the selected MIMO mode, wherein the MIMO mode decider selects an open-loop (OL) MIMO mode from among the plurality of MIMO modes if the speed of the receiver is larger than a predetermined threshold, and selects a closed-loop (CL) MIMO mode from among the plurality of MIMO modes if the speed of the receiver is less than or equal to the predetermined threshold.

10. The apparatus of claim 9, wherein the MIMO mode decider transmits a MIMO mode information indicating the selected MIMO mode to the transmitter, and receives a feedback resource allocation information indicating the allocated feedback resources in response to the MIMO mode information.

11. The apparatus of claim 9, wherein the MIMO mode decider selects the CL MIMO mode from among the plurality of MIMO modes, if the speed of the receiver is less than or equal to the threshold and the receiver does not have channel quality information, a precoding index, and antenna information, and selects a dirty paper coding (DPC) mode from among the plurality of MIMO modes, if the speed of the receiver is less than or equal to the threshold and the receiver has the channel quality information, the precoding index, and the antenna information, wherein a presence or absence of the channel quality information, the preceding index, and the antenna information is further considered when selecting one of the plurality of MIMO modes.

12. The apparatus of claim 9, wherein the MIMO mode decider selects one of a diversity mode, a hybrid mode, and a spatial multiplexing mode according to a receiver measurement rank and a received signal strength if the OL MIMO mode is selected.

13. The apparatus of claim 11, wherein the MIMO mode decider selects one of a single user mode, a dual user mode, and a multi-user mode according to a number of users and a correlation between the transmitter and the receiver if the CL MIMO mode is selected, wherein the number of users and the correlation between the transmitter and the receiver is further considered when selecting one of the plurality of MIMO modes.

14. The apparatus of claim 11, wherein the MIMO mode decider selects one of a block diagonalization (BD) mode, a regularized block diagonalization (RBD) mode, and a vector perturbation (VP) mode according to a received signal strength if the DPC mode is selected, wherein the received signal strength is further considered when selecting one of the plurality of MIMO modes.

15. The apparatus of claim 11, wherein if the OL MIMO mode is selected, the allocated feedback resources include a diversity CQI channel, and if one of the CL MIMO mode and the DPC mode is selected, the allocated feedback resources include a band adaptive modulation and coding (AMC) CQI channel.

16. The apparatus of claim 13, wherein if the single user mode is selected, the feedback information includes a rank and layer order index (RLOI), a maximum CQI of streams, and a delta CQI, if the multi-user mode is selected, the feedback information includes the RLOI, the maximum CQI of streams, and a precoding index, and if the dual user mode is selected, the feedback information includes the RLOI, the maximum CQI of streams, and an offset channel quality information, wherein the RLOI is further considered when selecting one of the plurality of MIMO modes.

* * * * *